(12) United States Patent
Peacock et al.

(10) Patent No.: US 8,196,116 B2
(45) Date of Patent: Jun. 5, 2012

(54) TRACING OBJECTS IN OBJECT-ORIENTED PROGRAMMING MODEL

(75) Inventors: Brian D. Peacock, North Baddesley (GB); Christopher Paul White, Alton (GB)

(73) Assignee: International Business Systems Corporation, Armonk, NY (US)

( * ) Notice: Subject to any disclaimer, the term of this patent is extended or adjusted under 35 U.S.C. 154(b) by 678 days.

(21) Appl. No.: 12/415,126

(22) Filed: Mar. 31, 2009

(65) Prior Publication Data

US 2010/0251219 A1    Sep. 30, 2010

(51) Int. Cl.
*G06F 9/44*    (2006.01)
(52) U.S. Cl. ......................................................... 717/128
(58) Field of Classification Search .................. 717/127, 717/128, 147
See application file for complete search history.

(56) References Cited

U.S. PATENT DOCUMENTS

| | | | |
|---|---|---|---|
| 5,442,740 A | 8/1995 | Parikh | |
| 5,896,536 A | 4/1999 | Lindsey | |
| 6,754,890 B1* | 6/2004 | Berry et al. | 717/128 |
| 7,194,664 B1 | 3/2007 | Fung et al. | |
| 7,340,494 B1* | 3/2008 | Detlefs et al. | 1/1 |
| 7,506,317 B2* | 3/2009 | Liang et al. | 717/130 |
| 2001/0039609 A1* | 11/2001 | Houldsworth | 711/170 |
| 2002/0072830 A1* | 6/2002 | Hunt | 701/1 |
| 2002/0138507 A1* | 9/2002 | Shuf et al. | 707/206 |
| 2003/0167421 A1 | 9/2003 | Klemm | |
| 2004/0006765 A1* | 1/2004 | Goldman | 717/116 |
| 2006/0161601 A1 | 7/2006 | Barrs et al. | |
| 2007/0073739 A1* | 3/2007 | Jennings et al. | 707/100 |
| 2007/0266149 A1* | 11/2007 | Cobb et al. | 709/224 |
| 2010/0138930 A1* | 6/2010 | Little et al. | 726/26 |
| 2010/0306786 A1* | 12/2010 | Passey et al. | 719/314 |

FOREIGN PATENT DOCUMENTS

WO    2007113533 A1    10/2007

OTHER PUBLICATIONS

Application-Level Trace Logging. [online]. 5 pages. [retrieved on Mar. 27, 2009]. Retrieved from the Internet:< URL: http://asp.dotnetheaven.com/aspnet/doc/monitoring/apptrace.aspx>.
Catayst::Plugin::StackTrace—Display a Stack Trace on the Debug Screen. [online]. 4 pages. [retrieved on Mar. 27, 2009]. Retrieved from the Internet:< URL: http://search.cpan.org/~agrundma/Catalyst-Plugin-StackTrace-0.04/lib/Catalyst/Plugin/StackTrace.pm>.
Enabling Application-Level Tracing. [online]. 5 pages. [retrieved on Mar. 27, 2009]. Retrieved from the Internet:< URL: http://msdn2.microsoft.com/en-us/library/1y89ed7z(vs.71).aspx>.
RealView® Debugger, Trace User Guide. Copyright 2006, 2007 ARM® Limited. ARM DUI 0322B. Version 3.1., 338 pages.

* cited by examiner

*Primary Examiner* — Anna Deng
(74) *Attorney, Agent, or Firm* — Schmeiser, Olsen & Watts (57) ABSTRACT

A system and associated method for tracing state information of a target object. The target object is a data item of an application object executed in a virtual machine. Upon detecting a triggering event pertaining to the target object while executing the application object, the virtual machine stores the state information of the target object in a target state info object in a heap space such that the state information is maintained across instances of the virtual machine. The target object is associated with the target state info object by using a weak hash map entry such that the target state info object is garbage collected when the target object is garbage collected and such that the state information is not excessively accumulated. A system dump containing the target object and the target state info object is produced when the application object fails.

18 Claims, 5 Drawing Sheets

```
        <EXAMPLE 1>
301:    java -Xtrace:trigger=
302:    method{java/io/FileInputStream.open,savestate}
303:    -Xtrace:savestateclass=
304:    com.ibm.ras.StackSavedState MyApplication <EXAMPLE 2>
311:    java -Xtrace:trigger=
312:    method{java/io/FileInputStream.open,savestate}
313:    -Xtrace:trigger=
314:    method{java/io/FileInputStream.close,dumpsavedstate}
315:    -Xtrace:savestateclass= com.ibm.ras.StackSavedState
316:    MyApplication
```

TRACING OBJECTS IN OBJECT-ORIENTED PROGRAMMING MODEL

BACKGROUND OF THE INVENTION

The present invention discloses a system and associated method for tracing objects of an object-oriented program running in runtime environments. Conventional trace facilities in virtual machines are widely used for debugging of executable codes that runs in virtual machines. Conventional trace methods collect system information that describes states of virtual machines in executable codes when a particular action occurs pertaining to a specified object.

BRIEF SUMMARY

According to one embodiment of the present invention, a method for tracing state information of a target object comprises: detecting a triggering event pertaining to the target object within an application object, wherein the application object is a thread of execution executed by a virtual machine, and wherein said detecting performed by a processor of a computer system in which the virtual machine operates, said virtual machine encapsulates details specific to hardware of the computer system such that the application object running on the virtual machine is executed in a manner independent from the hardware of the computer system; determining that a target state info object associated with the target object does not exist in a heap space of the virtual machine, wherein the target state info object is a data object dedicated to store state information of the target object, wherein the virtual machine further comprises the heap space for all application objects of the virtual machine, wherein the virtual machine allocates a memory area for a respective application object in the heap space when the respective application object is created and garbage-collects the memory area for the respective application object when the respective application object becomes inactive; creating the target state info object according to a type defined for the target state info object; storing the state information of the target object in the created target state info object; and associating the target object with the created target state info object, said associating comprising creating a weak hash map entry, said associating comprising assigning the target object to a key of the weak hash map entry, and said associating comprising assigning the target state info object to a value of the weak hash map entry, and wherein said weak hash map entry enables the virtual machine to garbage-collect the value of the weak hash map entry upon garbage-collecting the key of the weak hash map entry.

According to one embodiment of the present invention, a computer program product comprises a computer readable memory unit that embodies a computer readable program code. The computer readable program code contains instructions that, when executed by a processor of a computer system, implement a method for tracing state information of a target object.

According to one embodiment of the present invention, a computer system comprises a processor and a computer readable memory unit coupled to the processor, wherein the computer readable memory unit containing instructions that, when executed by the processor, implement a method for tracing state information of a target object.

DETAILED DESCRIPTION

Figure 1A:
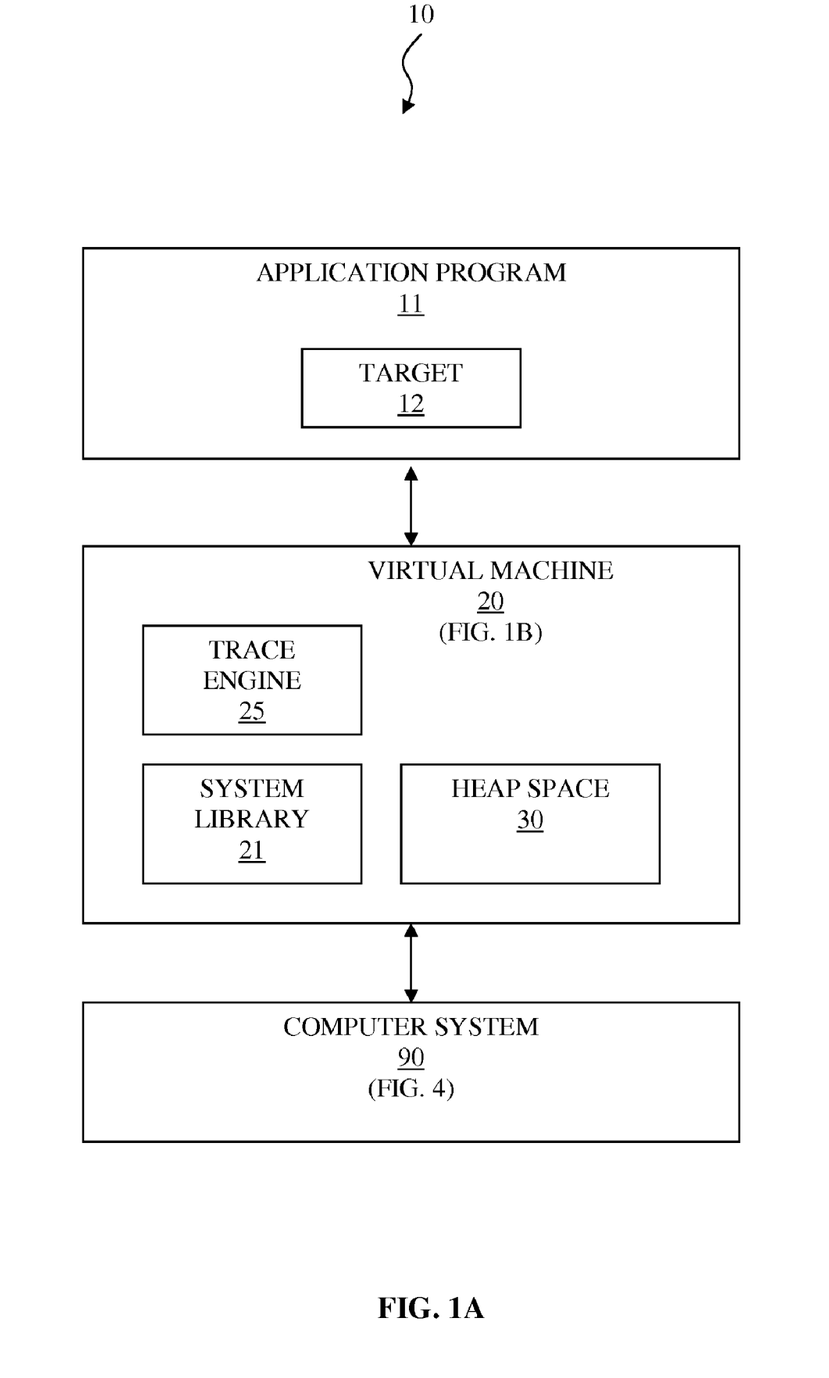
FIG. 1A illustrates a system for tracing state information of a target item of an application program, in accordance with embodiments of the present invention.

FIG. 1A illustrates a system 10 for tracing state information of a target item 12 of an application program 11, in accordance with embodiments of the present invention. The system 10 comprises an application program 11, a virtual machine 20, and a computer system 90.

The application program 11 is a computer program comprising instructions of the virtual machine 20 and the target item 12 that is to be traced by the embodiments of the present invention. The application program 11 runs on the virtual machine 20.

The virtual machine 20 is a software program that simulates a computing environment in which the application program 11 runs. Similar to conventional microprocessor computers, the virtual machine 20 is implemented according to a virtual machine specification that defines, inter alia, a virtual machine code instruction set, a set of registers, a stack, a garbage-collected heap, an area for storing methods, etc. The set of registers, the stack, the garbage-collected heap, the area for storing methods, etc., are allocated in respectively associated memory areas of the computer system 90 according to the virtual machine specification. The virtual machine 20 employs the computer system 90 as a hardware platform for execution of the virtual machine 20. Each component in the virtual machine specification is simulated by using resources in the computer system 90. The virtual machine 20 encapsulates details specific to hardware of the computer system 90 from the application program 11 such that the application program 11 running on the virtual machine 20 can be executed in a platform-independent manner.

The virtual machine 20 comprises a trace engine 25, a system library 21, and a heap space 30. The trace engine 25 is a system program of the virtual machine 20 that traces events pertaining to the target item 12. The system library 21 comprises data type definitions that are used by the trace engine 25. The heap space 30 is a garbage-collected memory space for application programs running in the virtual machine 20. See descriptions of FIG. 1B, infra, for details of the virtual machine 20.

The computer system 90 is the hardware platform in which the virtual machine 20 executes. Consequently, the virtual machine 20 and the trace engine 25 are performed by one or more processor of the computer system 90. The system library 21 and the heap space 30 are allocated and managed by the virtual machine 20 within memory devices of the computer system 90. See descriptions of FIG. 4, infra, for details of the computer system 90.

Figure 1B:
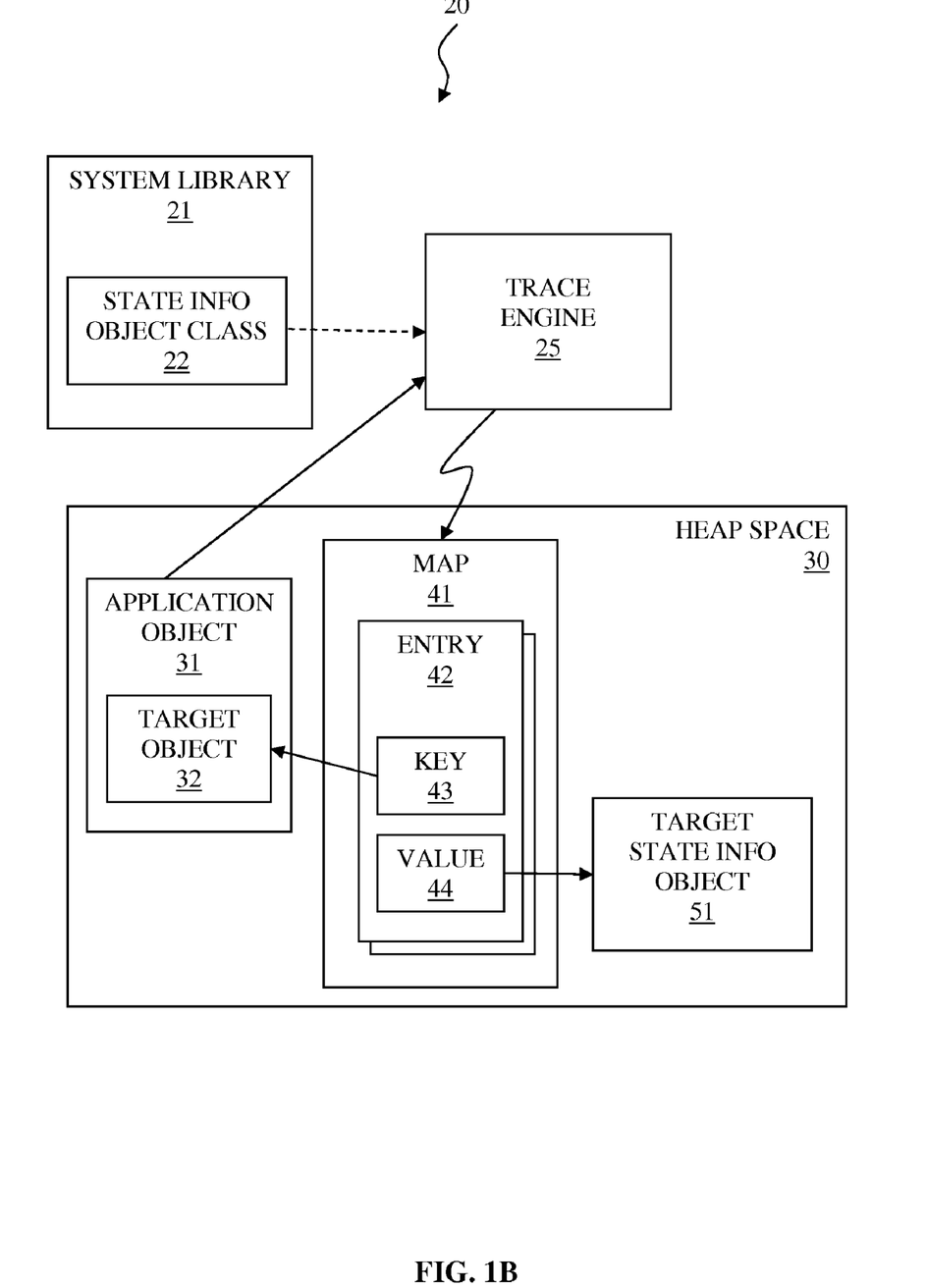
FIG. 1B illustrates the virtual machine of FIG. 1A for tracing state information of a target object within an application object, in accordance with the embodiments of the present invention.

FIG. 1B illustrates the virtual machine 20 of FIG. 1A, supra, for tracing state information of a target object 32 within an application object 31, in accordance with the embodiments of the present invention. The virtual machine 20 comprises the system library 21, the trace engine 25, and the heap space 30.

The system library 21 comprises type definitions that are used by the virtual machine 20. The system library 21 comprises a state info object class 22 that is a class type definition used by the trace engine 25 to create a target state info object 51 in the heap space 30. In this specification, the term "class" represents a type that defines one embodiment of an object comprising variables and methods. The term "object" represents a program unit comprising data and functionality that instantiates class variables and class methods of a class that defines the object, respectively.

The heap space 30 represents memory spaces for application programs executed by the virtual machine 20. Heaps in the heap space 30 are allocated and are garbage collected by the virtual machine 20. The heap space 30 is shared among all threads of application programs in the virtual machine 20. The heap space 30 is a data area from which memory for all class instances and arrays is allocated at runtime of the virtual machine 20 while executing the threads. The heap space 30 is created in a main memory area of the computer system 90 of FIG. 1A, supra, when the virtual machine 20 starts. Data items in the heap space 30 is allocated and garbage collected by the virtual machine 20.

The trace engine 25 is a system program component of the virtual machine 20 that traces specified events that occur while executing application programs. The trace engine 25 creates, in the heap space 30, an application object 31, a map 41, and a target state info object 51.

The application object 31 is an instance of a class implementing the application program 11 of FIG. 1A, supra. The application object 31 represents a thread of execution of the application program 11 within the heap space 30 while the application program 11 is executed by the virtual machine 20. The application object comprises the target object 32 that represents the target item 12 employed in the application program within the application object 31. The virtual machine 20 commences executing the application program 11 with at least one trace option that specifies the target object 32 for the trace engine 25 to trace. When the target object 32 of the application object 31 is invoked, the trace engine 25 is triggered to perform a trace action specified when the virtual machine 20 had been commenced. In one embodiment of the present invention, the trace action is saving state information of the target object 32. See FIG. 3, infra, for examples of commands starting a virtual machine 20 with trace options.

Each thread of execution for the application program in the virtual machine 20 has a respective private stack to store, in frames of the respective private stack, data and partial results of the execution, as well as to perform dynamic linking, return values for methods, and dispatch exceptions. Each frame of the respective private stack is created for each invocation of a method and is destroyed upon completing the invocation of the method. The virtual machine 20 allocates frames of the respective private stack in a heap space 30 of the virtual machine 20.

The trace engine 25 creates the map 41 and the target state info object 51 in the heap space 30 according to type definitions in the system library 21. The trace engine 25 saves state information of the target object 32 in the target state info object 51, and make a mapping between the target object 32 and the target state info object 51 by using the map 41.

The map 41 comprises at least one entry of the map 41. An entry 42 of said at least one entry of the map 41 comprises a key 43 and a value 44 that is mapped to the key 43. The entry 42 is identified by the key 43 that points to the target object 32 that is traced. The value 44 points to the target state info object 51 that stores state information of the target object 32 pointed by the key 43.

The target state info object 51 comprises multiple instances of state information pertaining to the target object 32 cumulated over time. The target object 32 may be traced for more than one triggering events, and state information for all triggering events specified to be traced for the target object 32 is stored in the target state info object 51 associated with the target object 32. The state information stored in the target state info object 51 may be, inter alia, a state of a current execution context such as a runtime stack of the virtual machine 20, etc. The target state info object 51 is created within the heap space 30 along with other data objects created by the application program. When a triggering event pertaining to the target object 32 occurs for the first time, the target state info object 51 is created and the state information of the target object 32 is stored. Thereafter, the target state info object 51 cumulates specified instances of state information of the target object 32 for each triggering event that occurs pertaining to the target object 32.

The content of the target state info object 51 is accessible as a data object in the heap space 30 using interfaces in the virtual machine 20. The content of the target state info object 51 is utilized in debugging and/or analyzing the application program related to behaviors of the target object 32 during the execution. The content of the target state info object 51 is communicated to a user of the virtual machine 20 through a debug data analysis tool such as standard error stderr output, memory dump, etc., by producing traditional trace output. The trace engine 25 is configured to transfer the content of the target state info object 51 when a condition is satisfied. Such condition may be, inter alia, a catastrophic problem within the application program, passing a separate trace/dump trigger point in the application program, etc.

In one embodiment of the present invention, the virtual machine 20 is a Java Virtual Machine (JVM®) and the map 41 employs the Class WeakHashMap of Java® 2 Platform (Java and JVM are registered trademarks of Sun Microsystems, Inc., in the United States and/or other countries.) A WeakHashMap is a map implementation based on a hash table with weak keys. An entry in the WeakHashMap is automatically garbage collected and consequently removed from the WeakHashMap when a key of the entry is discarded or is not in ordinary use.

In the same embodiment, when the target object 32 is garbage collected by the virtual machine 20 because the application program does not use the target object 32 any more, the target state info object 51 that is mapped to the target object 32 through an entry of the WeakHashMap is also garbage collected by the virtual machine 20. In this embodiment, respective target state info objects of all entries in the map 41 implemented as the WeakHashMap are mapped to a respective target object that is actively used. Thus, this embodiment does not use memory spaces to maintain trace data when target objects become inactive. Also, by using target state info objects in the heap space for storing trace data and by mapping respective target object and a mapped target state info object through the WeakHashMap, the embodiment utilizes the JVM to manage the heap space 30 such that the trace data does not interfere with the execution of the application program. The amount of the heap space that is used for trace data is managed by the JVM. Consequently, the JVM garbage collects inactive target objects and associated target state info objects such that the JVM executes the application program without being affected by a lack of available memory in the heap space.

Where an application program creates numerous File objects during execution, the same embodiment of the present invention enables the user of the virtual machine (JVM) to analyze and/or debug a failure to read, write, and/or close a File object created by the application program. The same embodiment creates a respective File state info object and associates the respective File state info object with each File object created. The respective File state info object comprises call path information used for creating each File object. The failure to read, write, and/or close is specified as a triggering event for the trace engine to output the respective File state info object that is associated with each File object. Consequently, when a File object of each File object causes the failure to read, write, and/or close the File object, the user of the application program obtains a File state info object that is associated with the File object. Also, because the File object and the File state info object are associated via a WeakHashMap entry, when the File object becomes inactive, both the File object and the File state info object are garbage collected by the JVM.

Figure 2:
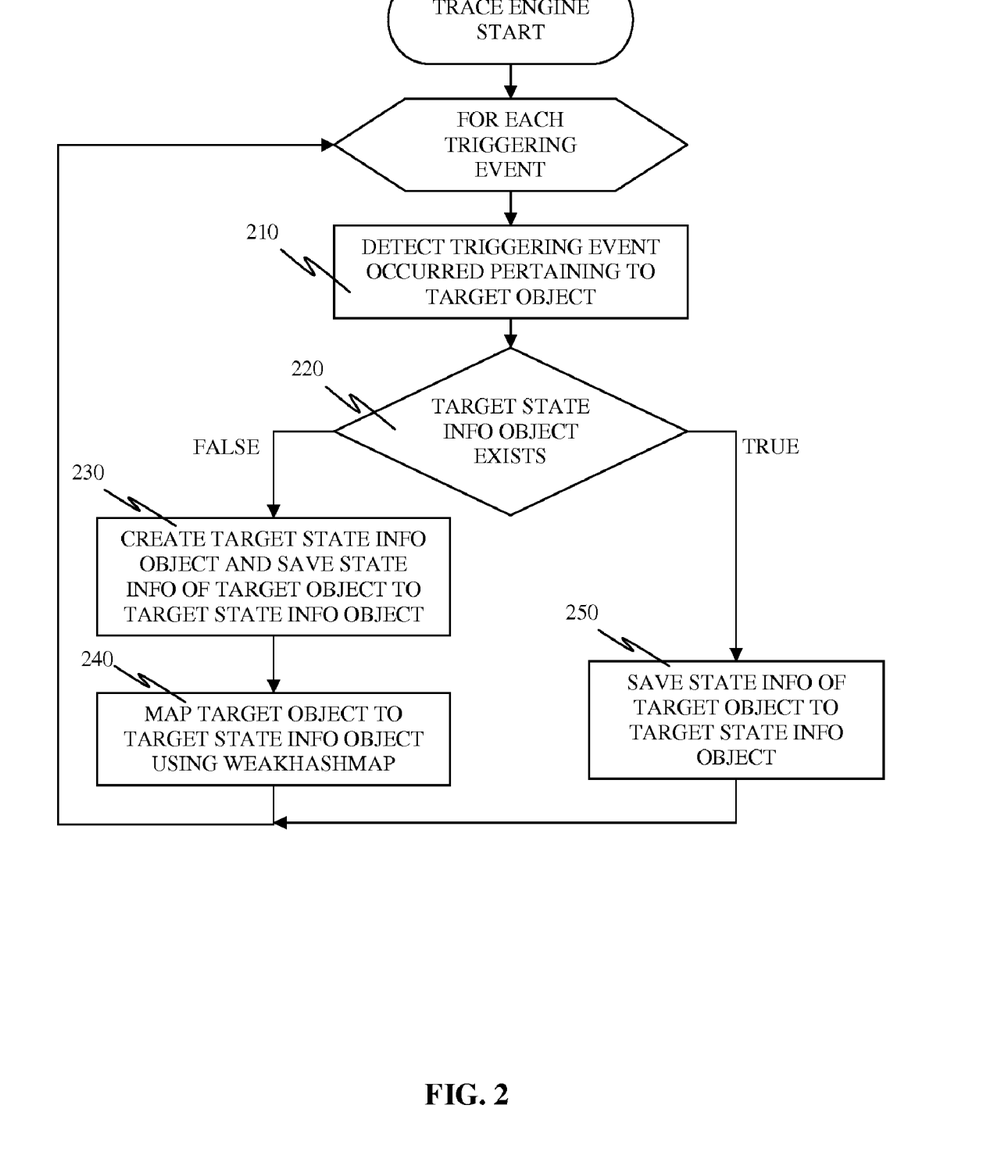
FIG. 2 is a flowchart depicting a method for tracing state information of a target object, in accordance with the embodiments of the present invention.

FIG. 2 is a flowchart depicting a method for tracing state information of a target object, in accordance with the embodiments of the present invention.

When a virtual machine starts, a trace engine of the virtual machine is configured to trace a triggering event pertaining to a target object by storing state information of the target object upon the triggering event upon detecting each occurrence of the triggering event. In other embodiment, a trace action other than storing state information may be configured. See FIG. 3, infra, for examples of trace actions.

In step 210, the trace engine detects the triggering event pertaining to the target object during the execution of an application program comprising the target object. The trace engine proceeds with step 220.

In step 220, the trace engine determines whether a target state info object for the target object exists in the heap area. If the trace engine determines that the target state info object for the target object does not exist, the trace engine proceeds with step 230. If the trace engine determines that the target state info object for the target object exists because the target state info object had been created in a previous triggering event, the trace engine proceeds with step 250.

In step 230, the trace engine creates the target state info object and saves state information of target object to target state info object. The amount of state information that is saved in the target state info object is specifically configured for the target object. The target state info object is created to save state information of the target object in the heap area. The target state info object enables state information to be stored in an application object in the heap area. Because the virtual machine provides memory management and garbage collection for objects in the heap area, there is no overhead to manage the state information that is stored as an object. The trace engine proceeds with step 240.

In step 240, the trace engine creates a WeakHashMap entry, sets the target object as a key of the WeakHashMap entry, and maps the target state info object as a value of the WeakHashMap entry. Because the target state info object is mapped to the target object via the WeakHashMap entry, when the target object is garbage collected, the WeakHashMap entry and the target state info object associated through the WeakHashMap entry are automatically removed along with the target object. The allocation and garbage collection of objects in the heap space are performed by a memory management component of the virtual machine. When the trace engine creates any object in the heap space, the virtual machine takes a request from the trace engine and performs actual memory operation necessary for the request. The trace engine performs steps 230 and 240 when the triggering event occurs for the first time pertaining to the target object.

When the virtual machine crashes, the virtual machine creates a system dump of entries of the WeakHashMap. Consequently, the target object and the target state info object survive a termination of the virtual machine as application objects in a system dump. The state information stored in the target state info object is available in the system dump for analysis in debugging the application program pertaining to the target object.

In step 250, the trace engine cumulates state information of the target object at the time of the triggering event to the existing target state info object associated with the target object through the WeakHashMap entry. The trace engine performs step 250 when the triggering event had previously occurred pertaining to the target object.

In one embodiment of the present invention, when the target object becomes unreferenced during the execution of the application program, the virtual machine removes, by garbage collection, the target object from the heap space and the target state info object that is associated through the WeakHashMap entry. The WeakHashMap is supported by a hash table based map implementation of weak keys in existing Java Virtual Machines (JVM). By using the WeakHashMap in associating the target object and the target state info object, the embodiment maintains trace data only for objects that are actively referred in the application program. Consequently, the embodiment prevents trace data from taking too much heap space and interfering with the execution of the application program. The embodiment of the present invention enables both efficient usage of the heap space and a necessary accumulation of trace data.

Figure 3:
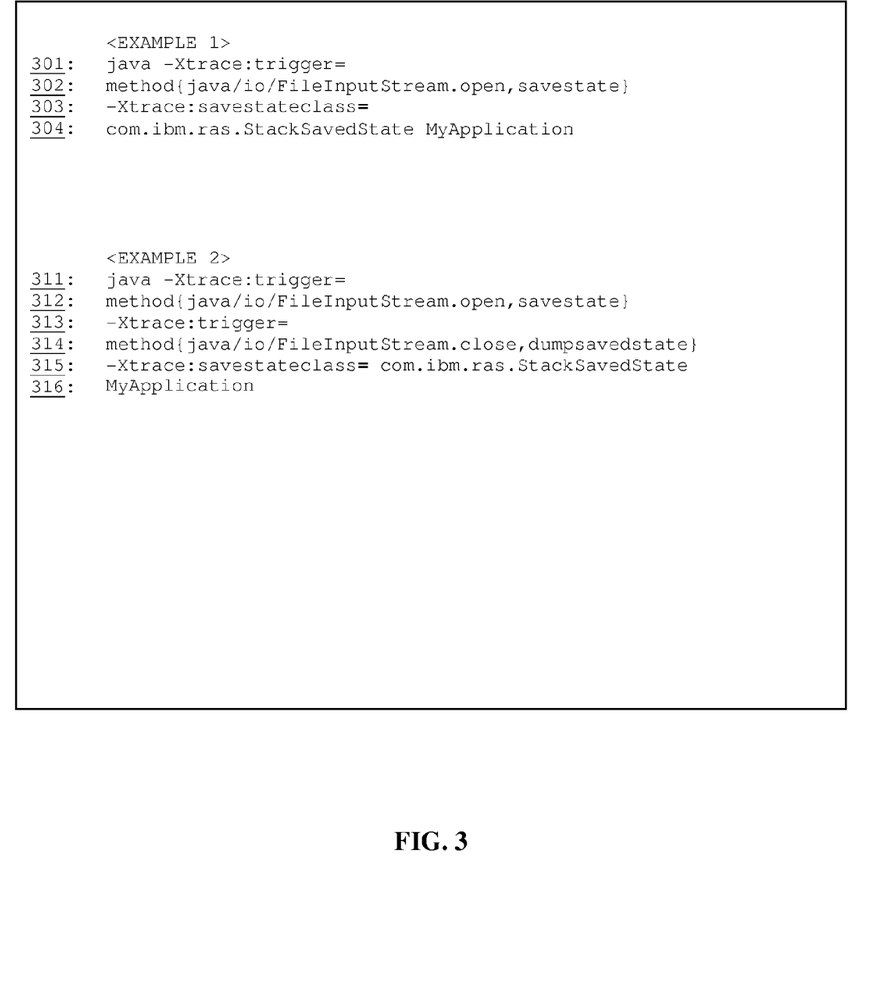
FIG. 3 illustrates an example command configured to trace state information of a target object, in accordance with the embodiments of the present invention.

FIG. 3 illustrates an example command configured to trace state information of a target object, in accordance with the embodiments of the present invention.

Lines 301 to 304 display a first example command that starts a virtual machine "java" with trace options of the present invention. A first trace option "-Xtrace: trigger=method{java/io/FileInputStream.open, savestate}" in lines 301 to 302 specifies a target object "java/io/FileInputStream.open" that triggers a trace action "savestate." The trace action "savestate" saves state information in the java stack upon entering the method "java/io/FileInputStream.open." A second trace option "-Xtrace: savestateclass=com.ibm.ras.StackSavedState" in lines 303 to 304 specifies a target state info object class that is used to perform the trace action "savestate." The virtual machine "java" executes an application "MyApplication" specified in line 304 with the trace options. When the target object "java/io/FileInputStream.open" is invoked during the execution, a trace engine in the virtual machine performs the trace action "savestate" by saving state information of the target object to the target state info object defined by the class "com.ibm.ras.StackSavedState" according to the method described in FIG. 2, supra.

Lines 311 to 316 display a second example command that starts a virtual machine "java" with trace options of the present invention. A first trace option "-Xtrace: trigger=method{java/io/FileInputStream.open, savestate}" in lines 311 to 312 specifies a first target object "java/io/FileInputStream.open" that triggers a first trace action "savestate." The first trace action "savestate" saves state information in the java stack upon entering the method "java/io/FileInputStream.open." A second trace option "-Xtrace: trigger=method{java/io/FileInputStream.close, dumpsavedstate}" in lines 313 to 314 specifies a second target object "java/io/FileInputStream.close" that triggers a second trace action "dumpsavedstate." The second trace action "dumpsavedstate" produces a trace log upon entering the method "java/io/FileInputStream.close." A third trace option "-Xtrace:savestateclass=com.ibm.ras.StackSavedState" in line 315 specifies a target state info object class that is used to perform the trace actions "savestate" and "dumpsavedstate." The virtual machine "java" executes an application "MyApplication" specified in line 316 with the trace options. When the first target object "java/io/FileInputStream.open" is invoked during the execution, a trace engine in the virtual machine performs the first trace action "savestate" by saving state information of the target object to the target state info object defined by the class "com.ibm.ras.StackSavedState" according to the method described in FIG. 2, supra. When the second target object "java/io/FileInputStream.close" is invoked during the execution, the trace engine in the virtual machine performs the second trace action "dumpsavedstate" by creating a memory dump of the target state info object defined by the class "com.ibm.ras.StackSavedState". The memory dump is later used to identify a part of the application program that caused any error in FileInputStream objects operations.

When the target object is created a first trigger trace point saves the java stack of the virtual machine. The target object may be determined by, inter alia, a specific type of an object, etc. When a triggering action occurs pertaining to the target object, a second trigger trace point is activated and the java stack saved by the first trigger trace point is displayed to show a program context in which the target object is created. Wherein the second trigger trace point is not reached within an instance comprising the target object, trace data saved by the first trigger trace point is removed when the target object is removed from the heap by the garbage collector.

Figure 4:
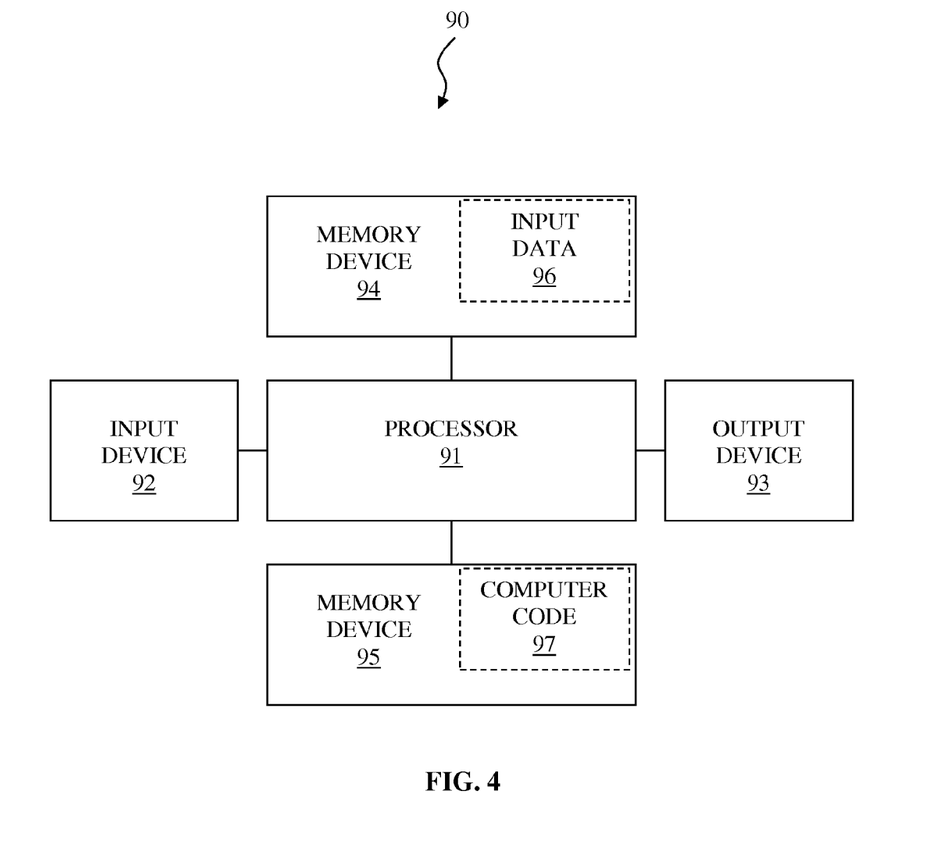
FIG. 4 illustrates a computer system used for tracing state information of a target object, in accordance with the embodiments of the present invention.

FIG. 4 illustrates a computer system 90 used for tracing state information of a target object, in accordance with the embodiments of the present invention.

The computer system 90 comprises a processor 91, an input device 92 coupled to the processor 91, an output device 93 coupled to the processor 91, and computer readable memory units comprising memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for tracing state information of an object in an application program according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) 94, 95 may be utilized. The term computer usable medium or computer readable medium collectively refers to computer usable/readable storage medium 94, 95. The computer-usable or computer-readable medium 94, 95 may be, for example but not limited to, an electronic, magnetic, optical, electromagnetic, infrared, or semiconductor system, apparatus, a device, or any suitable combination of the foregoing. More specific examples (a non-exhaustive list) of the computer-readable medium 94, 95 would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-usable or computer-readable medium 94, 95 could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium 94, 95 may be any medium that can contain, or store a program for use by or in connection with an instruction execution system, apparatus, or device.

Computer code 97 for carrying out operations of the present invention may be written in any combination of one or more programming languages, including an object oriented programming language such as Java, Smalltalk, C++ or the like and conventional procedural programming languages, such as the "C" programming language or similar programming languages. The computer code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer code 97" in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in the computer-readable medium 94, 95 that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for tracing state information of a target object, the method comprising:

detecting a triggering event pertaining to the target object within an application object, wherein the application object is a thread of execution executed by a virtual machine, wherein said detecting is performed by a processor of a computer system in which the virtual machine operates, and wherein said virtual machine encapsulates details specific to hardware of the computer system such that the application object running on the virtual machine is executed in a manner independent from the hardware of the computer system;

determining that a target state info object associated with the target object does not exist in a heap space of the virtual machine, wherein the target state info object is a data object dedicated to store state information of the target object, wherein the virtual machine further comprises the heap space for all application objects of the virtual machine, wherein the virtual machine allocates a memory area for a respective application object in the heap space when the respective application object is created and garbage-collects the memory area for the respective application object when the respective application object becomes inactive;

creating the target state info object according to a type defined for the target state info object;

storing the state information of the target object in the created target state info object; and associating the target object with the created target state info object, said associating comprising creating a weak hash map entry, said associating comprising assigning the target object to a key of the weak hash map entry, and said associating comprising assigning the target state info object to a value of the weak hash map entry, and wherein said weak hash map entry enables the virtual machine to garbage-collect the value of the weak hash map entry upon garbage-collecting the key of the weak hash map entry.

2. The method of claim 1, wherein the type defined for the target state info object comprises a data item to hold content of a runtime context of the virtual machine at a time of said detecting while executing the application object.

3. The method of claim 1, the method further comprising:

detecting, while executing the application object, the triggering event pertaining to the target object, wherein said detecting is performed by the processor;

determining that the target state info object associated with the target object exists in the heap space; and storing the state information of the target object in the target state info object.

4. The method of claim 1, the method further comprising:

detecting, while executing the application object, the triggering event pertaining to the a second target object, said second target object being another data item within the application object, wherein said detecting is performed by the processor, and wherein a runtime context of the virtual machine while executing the application object is shared between the target object and the second target object such that the state information of the target object is identical to state information of the second target object;

determining that the target state info object associated with the target object exists in the heap space; and creating a system log to a storage medium of the computer system with the state information of the target object that is stored in the target state info object such that the system log in the storage medium is retrievable by a separate instance of the virtual machine.

5. The method of claim 4, wherein the target object is an open method of a file input stream, and the second target object is a close method of the file input stream.

6. The method of claim 1, wherein the virtual machine is launched by a command that configures said tracing, wherein the command comprises at least one trace option and an application program, wherein a first trace option of said at least one trace option specifies the target object and at least one trace action that is associated with the target object, wherein a second trace option of said at least one trace option specifies the type defined for the target state info object, wherein said type is referred to by the virtual machine to perform said tracing, and wherein the application program is represented as the application object within the virtual machine.

7. A computer program product comprising:

a computer readable storage device having a computer readable program code embodied therein, said computer readable program code containing instructions that perform tracing state information of a target object, said tracing comprising:

detecting a triggering event pertaining to the target object within an application object, wherein the application object is a thread of execution executed by a virtual machine, wherein said detecting is performed by a processor of a computer system in which the virtual machine operates, and wherein said virtual machine encapsulates details specific to hardware of the computer system such that the application object running on the virtual machine is executed in a manner independent from the hardware of the computer system;

determining that a target state info object associated with the target object does not exist in a heap space of the virtual machine, wherein the target state info object is a data object dedicated to store state information of the target object, wherein the virtual machine further comprises the heap space for all application objects of the virtual machine, wherein the virtual machine allocates a memory area for a respective application object in the heap space when the respective application object is created and garbage-collects the memory area for the respective application object when the respective application object becomes inactive;

creating the target state info object according to a type defined for the target state info object;

storing the state information of the target object in the created target state info object; and associating the target object with the created target state info object, said associating comprising creating a weak hash map entry, said associating comprising assigning the target object to a key of the weak hash map entry, and said associating comprising assigning the target state info object to a value of the weak hash map entry, and wherein said weak hash map entry enables the virtual machine to garbage-collect the value of the weak hash map entry upon garbage-collecting the key of the weak hash map entry.

8. The computer program product of claim 7, wherein the type defined for the target state info object comprises a data item to hold content of a runtime context of the virtual machine at a time of said detecting while executing the application object.

9. The computer program product of claim 7, said tracing further comprising:

detecting, while executing the application object, the triggering event pertaining to the target object, wherein said detecting is performed by the processor;

determining that the target state info object associated with the target object exists in the heap space; and storing the state information of the target object in the target state info object.

10. The computer program product of claim 7, said tracing further comprising:

detecting, while executing the application object, the triggering event pertaining to the a second target object, said second target object being another data item within the application object, wherein said detecting is performed by the processor, and wherein a runtime context of the virtual machine while executing the application object is shared between the target object and the second target object such that the state information of the target object is identical to state information of the second target object;

determining that the target state info object associated with the target object exists in the heap space; and creating a system log to a storage medium of the computer system with the state information of the target object that is stored in the target state info object such that the system log in the storage medium is retrievable by a separate instance of the virtual machine.

11. The computer program product of claim 10, wherein the target object is an open method of a file input stream, and the second target object is a close method of the file input stream.

12. The computer program product of claim 7, wherein the virtual machine is launched by a command that configures said tracing, wherein the command comprises at least one trace option and an application program, wherein a first trace option of said at least one trace option specifies the target object and at least one trace action that is associated with the target object, wherein a second trace option of said at least one trace option specifies the type defined for the target state info object, wherein said type is referred to by the virtual machine to perform said tracing, and wherein the application program is represented as the application object within the virtual machine.

13. A computer system comprising:

a processor and a computer readable storage device coupled to the processor, said computer readable storage medium containing instructions that when executed by the processor implement tracing state information of a target object, said tracing comprising:

detecting a triggering event pertaining to the target object within an application object, wherein the application object is a thread of execution executed by a virtual machine, wherein said detecting is performed by a processor of a computer system in which the virtual machine operates, and wherein said virtual machine encapsulates details specific to hardware of the computer system such that the application object running on the virtual machine is executed in a manner independent from the hardware of the computer system;

determining that a target state info object associated with the target object does not exist in a heap space of the virtual machine, wherein the target state info object is a data object dedicated to store state information of the target object, wherein the virtual machine further comprises the heap space for all application objects of the virtual machine, wherein the virtual machine allocates a memory area for a respective application object in the heap space when the respective application object is created and garbage-collects the memory area for the respective application object when the respective application object becomes inactive;

creating the target state info object according to a type defined for the target state info object;

storing the state information of the target object in the created target state info object; and associating the target object with the created target state info object, said associating comprising creating a weak hash map entry, said associating comprising assigning the target object to a key of the weak hash map entry, and said associating comprising assigning the target state info object to a value of the weak hash map entry, and wherein said weak hash map entry enables the virtual machine to garbage-collect the value of the weak hash map entry upon garbage-collecting the key of the weak hash map entry.

14. The computer system of claim 13, wherein the type defined for the target state info object comprises a data item to hold content of a runtime context of the virtual machine at a time of said detecting while executing the application object.

15. The computer system of claim 13, said tracing further comprising:

detecting, while executing the application object, the triggering event pertaining to the target object, wherein said detecting is performed by the processor;

determining that the target state info object associated with the target object exists in the heap space; and storing the state information of the target object in the target state info object.

16. The computer system of claim 13, said tracing further comprising:

detecting, while executing the application object, the triggering event pertaining to the a second target object, said second target object being another data item within the application object, wherein said detecting is performed by the processor, and wherein a runtime context of the virtual machine while executing the application object is shared between the target object and the second target object such that the state information of the target object is identical to state information of the second target object;

determining that the target state info object associated with the target object exists in the heap space; and creating a system log to a storage medium of the computer system with the state information of the target object that is stored in the target state info object such that the system log in the storage medium is retrievable by a separate instance of the virtual machine.

17. The computer system of claim 16, wherein the target object is an open method of a file input stream, and the second target object is a close method of the file input stream.

18. The computer system of claim 13, wherein the virtual machine is launched by a command that configures said tracing, wherein the command comprises at least one trace option and an application program, wherein a first trace option of said at least one trace option specifies the target object and at least one trace action that is associated with the target object, wherein a second trace option of said at least one trace option specifies the type defined for the target state info object, wherein said type is referred to by the virtual machine to perform said tracing, and wherein the application program is represented as the application object within the virtual machine.

* * * * *